Feb. 2, 1943.                    J. C. FISK                    2,309,891
                              COMPARATOR GAUGE
                           Filed Aug. 3, 1940                2 Sheets-Sheet 1
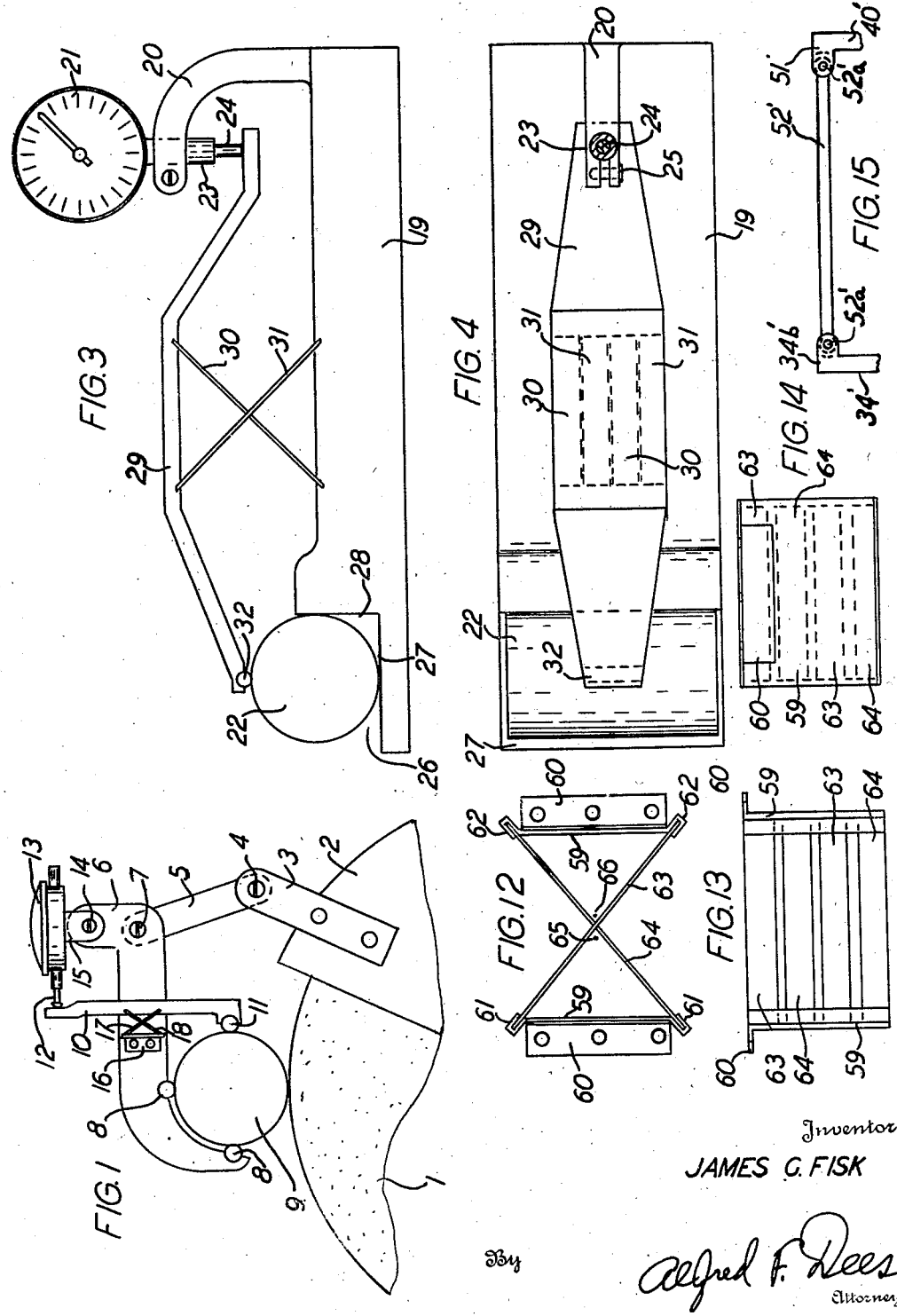
Inventor
JAMES C. FISK
By Alfred F. Dees
Attorney Feb. 2, 1943. J. C. FISK 2,309,891
COMPARATOR GAUGE
Filed Aug. 3, 1940 2 Sheets-Sheet 2
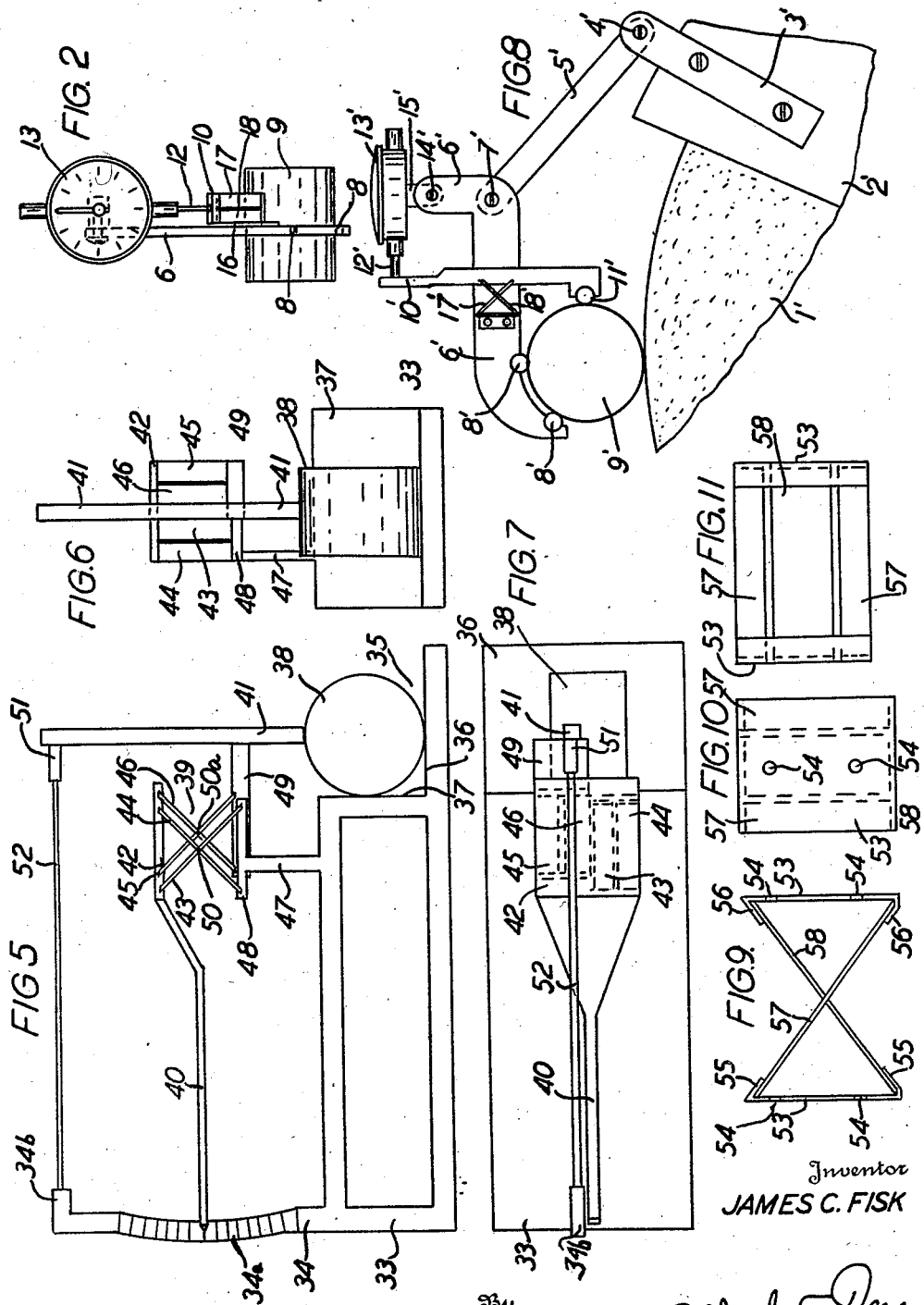
Inventor
JAMES C. FISK
By Alfred F. Dees
Attorney Patented Feb. 2, 1943

2,309,891

UNITED STATES PATENT OFFICE 2,309,891

COMPARATOR GAUGE

James C. Fisk, Flint, Mich.

Application August 3, 1940, Serial No. 350,377

6 Claims. (Cl. 33—148)

This invention relates to comparator gauges in general and in its more specific aspects relates to a comparator gauge for use on grinding machines and in fact on any machine tool producing profiled or dimensioned work.

The object of this invention is to construct a gauge that has relatively moving parts and in which the friction of the moving parts is reduced to an absolute minimum or is entirely eliminated.

Another object of the invention is to construct a comparator gauge in which lost motion is reduced to a minimum or in which the degree of lost motion has been reduced to a constant irrespective of the age of the gauge or its condition of use.

A still further object of the invention is to construct a gauge having rotational parts in which the position of the fulcrum remains substantially constant and in which the fulcrum itself follows the motion of the movable member beyond a predetermined angle of rotation.

Another and further object of the invention is to construct a hinge member satisfying the above requirements for controlling the fulcrum of relatively movable lever members or other pivotally mounted lever members whose motion is rotational through a given degree of movement.

A still further object of the invention is to construct a comparator gauge with relatively moving parts which can be deluged with the coolant fluid of a grinding machine or other machine tool and retain its accuracy regardless of length of use or the number of times it is deluged with coolant.

Another and further object of the invention is to construct a gauge in which one part moves relative to the other substantially rotationally and having a substantially frictionless bearing or hinged connection and which will operate without frictional resistance.

Another and further object of the invention is to construct a hinge connection for a gauge or other precision motion device which will operate without lubrication, which will faithfully and accurately follow the same path without lost motion during each cycle of operation and which will offer the same degree of resistance during each cycle of operation irrespective of operating conditions.

Other and further objects will occur to those skilled in the art to which this invention appertains as the description proceeds which taken in connection with the accompanying drawings sets forth a preferred embodiment of the invention and some selected modifications thereof but it is to be distinctly understood that such embodiment and modifications are not to be taken as limitations of the invention which is limited only by the appended claims and any and all modifications, alterations and variations of structure coming within the spirit and scope thereof are deemed included herein.

In the drawings:

Figure 1 shows an elevational view of the preferred form of my invention applied to a grinding machine.

Figure 2 shows a top plan view of the essential operating mechanism shown in Figs. 1 and 8.

Figure 3 shows an elevational view of a modified gauge structure of the bench type.

Figure 4 shows a plan view of the device of Figure 3 with the dial mechanism deleted for clearness.

Figure 5 shows an elevational view of another type gauge.

Figure 6 shows an end view of the structure of Figure 5.

Figure 7 shows a plan view of the device of Figure 5.

Figure 8 shows a variation of the device of Figures 1 and 2.

Figure 9 shows an elevational view of a hinge structure.

Figure 10 shows an end view of the structure of Figure 9.

Figure 11 shows a plan view of the structure of Figure 10.

Figure 12 shows an elevational view of another hinge form.

Figure 13 shows a plan view of the structure of Figure 12.

Figure 14 shows an end elevation rotated 90 degrees of the structure of Figure 12.

Figure 15 shows a modification of a portion of the structure of Figure 5.

The essential objects of the invention are set forth in the preferred embodiment and selected modifications and initially attention is directed to Figures 1 and 2 in which 1 indicates a grinding wheel and 2 indicates a grinding wheel guard to which a bracket 3 is rigidly secured. Pivotally secured to the bracket 3 by means of a pivot pin 4 is a swinging lever or bar 5 to which the relatively fixed frame member 6 of a gauge is pivotally secured by means of a pin 7. Frame 6 has secured therein a pair of contact elements 8 that engage a work piece 9 acted upon by a grinding wheel 1 or any other machine tool cutter. The contact elements 8 are preferably in the form of spheres but they may be of any other structure that provides a single point or line contact as illustrated or a surface contacting shoe, the nature of the work piece surface always determining the character of the contacting element. Substantially rotatably mounted with respect to frame element 6 is a bar or lever member 10 that has arranged at its one end a contact point or element 11 identical in structure with that of elements 8, 9. The bar element 10 at its other end bears against a plunger 12 of dial mechanism 13 which is removably secured to frame 6 as well as pivotally thereto by means of screw 14 that extends through bracket 15 and into frame 6.

The means by which bar or lever 10 is rotatably associated with frame element 6 is of the flexible reed character and in which the reeds are crossed such that the line of intersection of the planes of each of the reads will be the fulcrum about which the bar 10 rotates such that a rotative movement of the contact 11 will be proportionately applied to the other end of the bar which engages the plunger 12 of the dial indicator 13. Preferred forms of the hinged construction will be set forth in greater detail at a later point in the specification but in the form contained herein consists primarily of a right angle bracket member 16 riveted or spot welded to the frame 6 and to which the crossed reeds 17 and 18 are secured. The reeds are rigidly attached to one portion of the bracket member 16 and the other end of the reeds are rigidly secured in appropriate slots milled into the bar 10 but which may be secured thereto in any other desirable manner.

Another form or modification of the invention is set forth in Figures 3 and 4 in which a base member 19 is provided and which has arranged thereon at its one end a bracket 20. The bracket 20 has clamped therein the stem portion 23 of a dial indicator 21 that enables the operator to observe the surface condition of a work piece 22. Bracket 20 at its free end is divided and supports the indicator stem 23 in which plunger 24 slides axially thereof. A screw 25 is adapted to firmly clamp the stem 23 of the dial indicator 21 between the split ends of bracket 20. The frame 19 at the left hand end as observed in Figure 3 has a right angular portion 26 comprising two faces 27 and 28 which are preferably hardened and which provide at least two points of line contact with the work piece 22.

It will be noted that this gauge is of the bench type and has rotatably mounted thereon a walking beam 29 by means of a cross reed hinge comprising crossed reed elements 30 and 31. Walking beam 29 has a contact point or element 32 similar in character to contact 11 and the opposite end of the walking beam engages the plunger 24 of dial indicator 21. The intersection line of the planes defined by the cross reed elements 30 and 31 is the fulcrum point or axis of rotation of the hinge elements rotatably connecting walking beam 29 and frame 19.

Another type of construction is set forth in Figure 5, 6 and 7 in which 33 indicates the frame element on one end of which is mounted element 34 having a portion 34a which serves as a dial and on the other end of which is a work receiving section 35 comprising two right angularly disposed faces 36 and 37 which are preferably hardened and which provide at least two lines or contact points for a work piece 38.

The rotatable element of the gauge comprises a set of cross reed hinges 39 that connect a pointer 40 with a third contact point or element 41 which is in the form of a rod extending vertically from the work piece 38 and which is in contact therewith. A portion of the pointer member 40 provides one of the elements 42 to which the crossed reeds 43, 44, 45 and 46 are secured, there being appropriate slots milled in one face of the element 42 in which the crossed reeds are secured.

It will be observed from an inspection of Figures 5 and 6 that only one set of the crossed reeds, viz. 43 and 44, at their other ends are secured to a fixed element. The other set of reeds 45 and 46 have their other ends secured to a movable element 49. Attached to the frame element by means of a column 47 is a plate 48 having slots milled therein which receive the said opposite or other ends of crossed reeds 43 and 44. Rigidly secured to the rod 41 is a plate element 49 which has a pair of slots milled therein which receive the opposite ends of crossed reed elements 45 and 46.

Attention is at this point invited to the fact that the hinge 39 comprises two separate sets of crossed reeds, of which reeds 43 and 44 comprise one set and reeds 45 and 46 comprise a second set; while it is preferable that each set have four reeds therein, only two are shown for the sake of simplicity. The number of reeds per hinge is dependent upon the size and character of hinge as well as the work piece to be measured. The gauge is, in fact, an amplifier and the degree of amplification is dependent upon the amount which fulcrum axis 50 and axis 50a are displaced. The closer 50 and 50a are brought together the greater the amplification will be and the farther they are placed apart the lesser will be the degree of amplification. The bisection line of the planes of the crossed reeds 43 and 44 forms fulcrum 50 and the bisection line of crossed reeds 45 and 46 forms the axis 50a. Elements 48 and 49 are shown in the drawings as having their upper planes displaced but it is preferable in many applications that these planes lay in the same or common plane. The displacement of the upper planes of elements 48 and 49 is largely for the purpose of clarifying the structure and to show clearly that there are two different elements.

The bar 34 is extended upwardly and has on its extreme end a boss or extension 34b. Likewise the upper end of rod 41 has an extension or boss 51 which is substantially in line with boss 34b. The two extensions or bosses are connected by a flexible reed element 52.

In the operation of the device the bar 41 and plate 49 will move vertically by reason of the two sets of hinges and the flexible reed 52 and simultaneously the pointer will likewise move relative to the dial 34a, the actual rotational movement of the pointer 40 being about crossed reeds 43 and 44 and reeds 45 and 46 in conjunction with reed 52 serving to keep bar 41 vertical and plate 49 horizontal. While the device is illustrated as measuring circular work, it is also particularly adapted to measure lineal dimensions and by a simple alternation of portions 36 and 37 almost any sized or length of work piece may be gauged for variations in lineal dimensions. The construction is extremely sensitive to dimensional variations in work pieces by reason of its ability to amplify variations; such amplification is accomplished by reason of the fact that fulcrum 50 and axis 50a may be operated extremely close together.

Figure 15 shows a variation of reed 52 which comprises a bar 52' pivotally connected to bar 40' and extension 51' and bar 34' and extension 34b' by means of pins 52a' and 52a'. Bar 52' has an eye formed in each end which is journaled on pins 52a' held in suitable eyes formed in the extension 34b' and 51'.

Figure 8 is similar in construction to that of Figure 1 and the plan view of its essential working elements is identical with that of Figure 2; the essential distinction between them residing in the fact that the contact points 8', 8' are differently spaced than in Fig. 1 wherein they are shown as 90 degrees apart and one of which is directly opposite the movable contact 11. In Figure 8 one of the contact points 8' is shown as less than 90 degrees displaced from the other contact point 8'. Contact point 11' is therefore not diametrically opposite one of the contacts 8'. The reason for placing the points 8', 8' less than 90 degrees apart is that many varieties of work pieces do not permit the use of gauges having diametrically disposed contacts 8' and 11' because the frame 6' will bear upon the cutters and not engage the work piece 9'; by the use of devices shown in Figure 8 the work piece may still be engaged at three points, thereby enabling a determination of dimensional variations. By the same token the contact points 8', 8' may be spaced more than 90 degrees apart relative to 11'. The device will not lose any of its accuracy even though two or more of the contact points are not diametrically opposed by reason of the fact that only three spaced points is all that is necessary to determine any true radius and furthermore because movable contact 11' determines only the degree of variation from the true diameter rather than measuring the actual diameter. The same reasoning applies to the modifications of Figures 3 to 7 in which the rotational movement of the movable element measures only the variation in true diameter or lineal dimension although it is entirely possible to so graduate the dials such that they will measure actual diameter. Each of the numerals of Figure 1 have been primed in Figure 8 as the construction is identical.

It was stated above as one of the objects of the invention that the gauges illustrated could be deluged with the abrasive bearing coolant fluid of the machine tool which if done with the ordinary needle point or any other type of bearing would soon destroy the accuracy of the gauge by reason of wear between the rotating parts and increasing the friction between them with a further consequent loss of efficiency. With this object in mind a bearing or hinge construction has been conceived that can be deluged with abrasive bearing coolant without the loss of efficiency, which is frictionless and always has the same degree of resistance to movement, and which hinge construction provides a fulcrum point or rotational axis about which the elements of the gauge or any other device may relatively rotate to secure at all times an accurate indication of the condition of any work piece or movement.

There are set forth herein two variations of the hinge construction one of which is set forth in Figs. 9 to 11. This hinge construction comprises two end pieces 53 that are securable to the relatively moving parts of a gauge or any other control or machine device. A series of holes 54 are provided for the purpose of aiding actual securement of the end pieces to said machine or gauge elements. Each of the end pieces have a portion of their ends bent as indicated in Figure 9 as at 55, 55 and 56, 56. In the particular variation set forth there are three crossed reed elements. Two of these 57, 57 are relatively narrow in width and each of which extend in the same direction and one reed element 58 which is relatively wide extends in the opposite direction. This particular hinge construction is relatively rigid, compact and has a rather low fabricational cost.

Figures 12, 13 and 14 disclose a more or less preferred type of hinge construction which comprises end pieces 59, 59 supporting right angle brackets 60 and 60 which are provided with means to secure them to the relatively moveable parts of a gauge. The ends 59, 59 are provided with U elements 61 and 62 which are adapted to receive the ends of the crossed reeds 63 and 64. The crossed reed elements are preferably arranged in pairs such that one reed is succeeded by another reed extending in a different direction or in other words in which the planes of said reeds bisect. The ends of each of the reeds are rigidly secured to the U elements 61 and 62 and retained by either welding, brazing or soldering.

The reed elements in all of the forms prescribed are preferably composed of comparatively thin pieces of sheet material that is highly resilient in character and more preferably made of spring stock. In each and every instance it is preferred that the reed elements be placed or spaced a short distance apart such that when one set of reeds moves relative to the other there will be no rubbing or contacting of the several elements. In that manner a substantially frictionless hinge is produced over which abrasive bearing coolant or any other foreign matter may flow without in any way affecting the efficiency or reliability of the hinge.

It will be noted that the fulcrums of the several hinged constructions are stationary for only a limited rotational movement of the gauge elements connected by the hinge. For any one work piece the variation in dimension will be truly indicated and even though the fulcrum of the hinge may shift as much as from points 65 to 66 and vice versa, each such displacement bears a definite constant related amount of movement to the relative rotational movement of the hinge members and can therefore be compensated. These points will necessarily vary with each and every size of gauge or specific application and since each size of gauge or use will necessarily have prescribed for it the limits within which it will be strictly accurate and will also define the diameter of the work pieces that may be accurately tested or gauged by the devices incorporating the instant invention, the operator or user of the gauge will be correctly informed of his measurements. This accuracy will be maintained irrespective of the length of life of the device and the rotational movement thereof within the limits of use for such device. This is true because the hinge or relatively rotating parts have no bearing surfaces to become fouled by abrasive bearing fluid or any other foreign matter that would normally be harmful to bearings whether in the machine type or in the bench type of gauge.

It is preferable that the reeds be so adjusted that they will have a tendency to rotate toward the work although auxiliary devices (not shown) may be employed for this purpose. The movable contact will then faithfully follow the work piece contour at all times and for any given work piece will faithfully record true variations in diameter. The bench type gauges are not limited in their use to round work as they can easily record variations in flat work pieces. The gauges can, in fact, be used to detect any surface or lineal dimensional variation by adapting same to the work piece to be tested. After each use the movable, rockable or rotatable element will be quickly restored to normal idle position by the action of the reeds.

The hinge constructions illustrated are not confined to use in gauges alone but are usable in any measuring or control device or any machine part in which two parts are secured together and in which there is a limited relative rotational movement between them as in such devices as pressure measuring instruments, lever parts in weighing devices, electrical and aircraft parts and instruments, and in automotive parts such as spring shackles and wheel mountings, and various other devices.

That which is considered new, novel and useful and which it is desired to protect by Letters Patent of the United States is as follows:

1. In a gauge for testing the surface variations of a work piece; means to support a work piece in proper relation to the gauge; a dial supported on said means; a substantially axially movable contact rod engaging said work piece and mounted on said means to support a work piece; two pairs of crossed reed hinges each of whose axes are laterally displaced; means connecting one end of said pairs of crossed reed hinges and mounting a pointer cooperating with said dial; means on said means to support a work piece for supporting the other end of one of said pairs of said hinges and means on said contact rod supporting the other end of said other pair of hinges, such that movement imparted to said rod will be transmitted to said pointer.

2. In a gauge for testing dimensional variations in a work piece; a frame having means to engage a work piece; a first means on said frame supporting a dail; a pointer bar co-operating with said dial and supported for movement relative to the frame and dial; a first cross reed hinge connecting said frame and said pointer bar; a second means contacting the work piece and supported on said first means for movement relative to said frame and proper movement relative to the work piece to detect dimensional variations in said work piece; a second cross reed hinge connecting said second means and said pointer bar; and said cross reed hinges translating the dimensional variations of said work piece to the relative movement of said pointer bar and frame and also proportioning the movement of said pointer bar and said second means.

3. In a gauge element for determining lineal dimensional variations in a work piece; a frame; a dial and a work supporting means on said frame; a pointer rockably associated with said frame and cooperating with said dial; a member movable axially of itself and relatively of the work piece supported on said frame; a set of cross reed hinges connecting said pointer and said frame; a set of cross reed hinges connecting said member and said pointer; said hinges operating on fulcrums laterally displaced; said cross reed hinges translating the axial motion of said member to movement of said pointer when said member is moved by dimensional variations in said work piece and said member and pointer movements being variously proportioned by variously laterally displacing said fulcrums.

4. In a gauge for determining dimensional variations in a work piece; a frame having means adapted to support a work piece; a dial means on said frame; a pointer bar cooperating with said dial and supported for rotational movement relative to said frame; a cross reed hinge connecting said frame and said pointer bar; work contacting means operatively associated with the work piece mounted for movement axially of itself and relative to said frame and proper movement relative to said work piece and supported on said frame; a cross reed hinge connecting said pointer bar and said work contacting means; and said cross reed hinges proportioning the movement of said pointer bar and said work contacting means and imposing the axial motion of said work contacting means on said pointer bar to measure dimensional variations in said work piece.

5. In a gauge for measuring dimensional variations in a work piece; a support to hold said work piece in proper relation to said gauge; a bracket on said support mounting a dial; a rod movable substantially axially of itself adapted to engage said work piece; a pointer bar cooperating with said dial by moving relatively thereof; a flexible element connecting one end of said rod and said bracket; a first pair of crossed reeds connecting said pointer bar and said rod; a second pair of crossed reeds connecting said frame and said pointer bar; said first pair of crossed reeds and said flexible means cooperating to maintain said rod in a substantially vertical position during the axial movement of said rod; and said pairs of crossed reeds adapted to translate the substantially axial motion of said rod to said relative motion of dial and pointer bar to thereby indicate dimensional variations in said work piece.

6. In a measuring device; a frame supporting a dial and work supporting means; a work contacting element supported on said frame and movable axially to itself while measuring dimensional variations in a work piece; a rockable pointer member connected by crossed reeds to said frame and movable relative to said dial; and said work contacting element connected by crossed reeds to said pointer member; both said crossed reeds transmitting the axial motion of said element to the rocking motion of said pointer to measure dimensional variations in said work piece.

JAMES C. FISK.